(12) United States Patent
Zollig

(10) Patent No.: US 10,456,948 B2
(45) Date of Patent: Oct. 29, 2019

(54) COMPONENT, METHOD FOR CONNECTING WOOD ELEMENTS, COMPUTER PROGRAM

(71) Applicant: Timber Structures 3.0 AG, Thun (CH)

(72) Inventor: Stefan Zollig, Thun (CH)

(73) Assignee: Timber Structures 3.0 AG, Thun (CH)

( * ) Notice: Subject to any disclaimer, the term of this patent is extended or adjusted under 35 U.S.C. 154(b) by 0 days.

(21) Appl. No.: 14/786,797

(22) PCT Filed: Mar. 31, 2014

(86) PCT No.: PCT/EP2014/056407
§ 371 (c)(1),
(2) Date: Jan. 14, 2016

(87) PCT Pub. No.: WO2014/173633
PCT Pub. Date: Oct. 30, 2014

(65) Prior Publication Data
US 2016/0121515 A1    May 5, 2016

(30) Foreign Application Priority Data

Apr. 24, 2013 (CH) .......................... 828/13

(51) Int. Cl.
*B32B 21/13* (2006.01)
*B27M 3/00* (2006.01)
(Continued)

(52) U.S. Cl.
CPC ............ *B27M 3/0053* (2013.01); *B27D 1/04* (2013.01); *B27D 1/06* (2013.01); *B32B 3/14* (2013.01); *B32B 21/13* (2013.01); *B32B 21/14* (2013.01)

(58) Field of Classification Search
CPC ... Y10T 428/192; Y10T 428/195; B27D 1/10; B27D 1/04; B32B 21/13; B32B 21/14; B32B 3/14
See application file for complete search history.

(56) References Cited

U.S. PATENT DOCUMENTS 1,594,889 A    8/1926   Loetscher
3,922,453 A *  11/1975  Seery ................. E04F 11/1836
                                                  256/59
(Continued)

FOREIGN PATENT DOCUMENTS

AT    505772 A4    4/2009
AT    507249 A2    3/2010
(Continued)

OTHER PUBLICATIONS

EP Search Report for EP Application No. 14714266.5, dated May 29, 2017, 10 pages.
(Continued)

*Primary Examiner* — Alexander S Thomas
(74) *Attorney, Agent, or Firm* — Blank Rome LLP

(57) ABSTRACT

The component (100) according to the invention has a first wood element (110) with at least a first main fiber direction (114) and a second wood element (120) with at least a second main fiber direction (124). At the end, and spaced apart, the first wood element (110) is adhesively bonded, on a first side cutting through the first main fiber direction (114), to a first side (121) of the second wood element (120) cutting through the second main fiber direction (124).

21 Claims, 9 Drawing Sheets

(51) Int. Cl.
B27D 1/06 (2006.01)
B27D 1/04 (2006.01)
B32B 3/14 (2006.01)
B32B 21/14 (2006.01)

(56) References Cited

U.S. PATENT DOCUMENTS

| | | | | |
|---|---|---|---|---|
| 6,378,579 | B1* | 4/2002 | Giltner | B27F 1/16 144/345 |
| 6,551,007 | B2* | 4/2003 | Lichtenberg | B27D 1/10 403/268 |
| 2002/0182361 | A1* | 12/2002 | Hayakawa | B27M 3/002 428/60 |
| 2010/0154333 | A1* | 6/2010 | Peek | C09J 5/00 52/232 |
| 2014/0216656 | A1* | 8/2014 | Koshti | C09J 4/06 156/332 |

FOREIGN PATENT DOCUMENTS

| | | |
|---|---|---|
| CA | 2292218 A1 | 1/2001 |
| DE | 526565 C | 6/1931 |
| DE | 3217612 A1 | 11/1983 |
| DE | 102011050874 A1 | 12/2011 |
| EP | 0038041 A2 | 10/1981 |
| EP | 0309356 A1 | 3/1989 |
| FR | 786001 A | 8/1935 |
| FR | 2215298 A1 | 8/1974 |
| WO | WO 01/07218 A1 | 1/2001 |
| WO | WO-2007048149 A1 | 5/2007 |
| WO | WO 2009/049343 A1 | 4/2009 |

OTHER PUBLICATIONS

International Search Report for PCT/EP2014/056407 dated Apr. 25, 2014, 6 pages.
German Office Action for Application No. 14714266.5, dated Sep. 24, 2018, 10 pages.

* cited by examiner

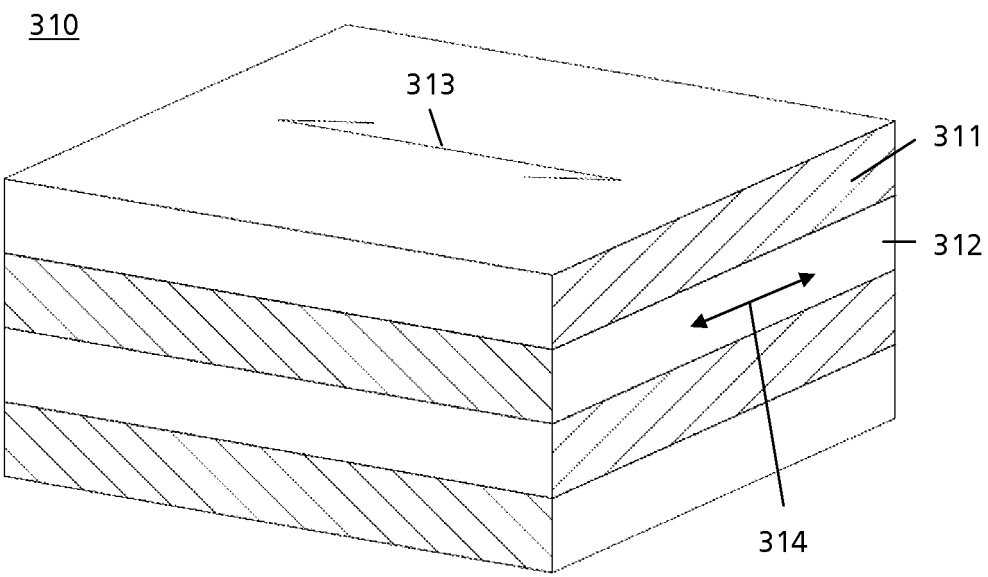
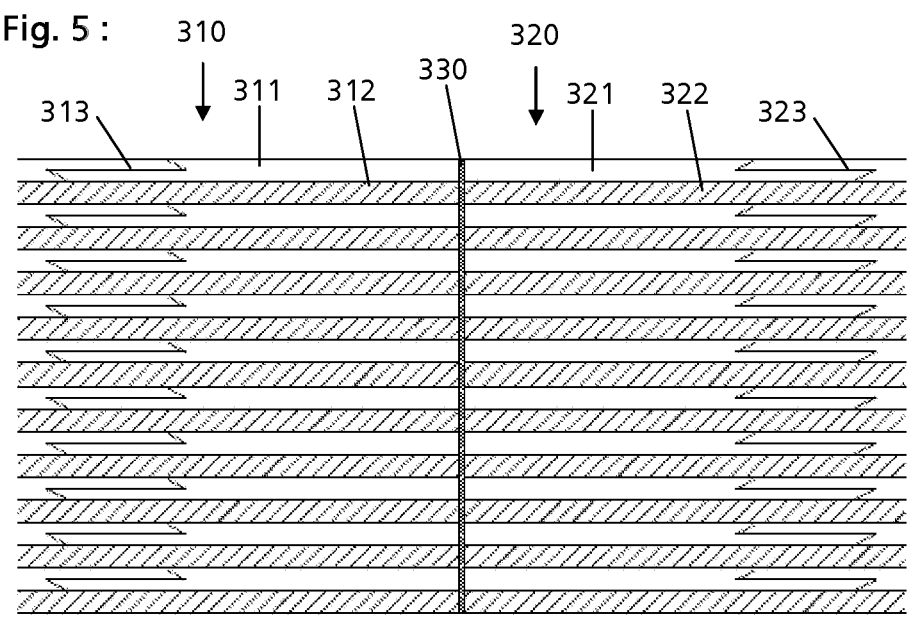
Fig. 5:
Fig. 5A:

COMPONENT, METHOD FOR CONNECTING WOOD ELEMENTS, COMPUTER PROGRAM

RELATED APPLICATIONS

This application is a national phase of PCT/EP2014/056407 filed on Mar. 31, 2014, which claims priority to Switzerland Patent Application No. CH00828/13 filed on Apr. 24, 2013. The contents of those applications are hereby incorporated by reference.

TECHNICAL FIELD

The invention relates to the connection of wood.

STATE OF THE ART

Wood exhibits various properties in relation to the direction of the fibers. In the main fiber direction (grain direction), wood is very stable under pressure and traction and can withstand very high forces, since the individual fibers together form fiber bundles. On the other hand, small forces that act perpendicular on the grain direction of the wood fibers are already sufficient to damage the wood. It is thus possible to build very stable constructions taking into account the direction of the wood fibers.

However, timber constructions have a natural limitation, namely the height of the tree in the direction of the grain and the thickness of the tree perpendicular to the main grain direction of the fibers. There are therefore a series of connections for timber elements in order to overcome these limitations.

On the one hand, it is known to glue a first wood element with a second wood element in such a manner that the main grain direction in the first wood element and in the second wood element are in parallel planes. Timber components consisting of at least two wood elements glued in this manner are called glue-laminated timber, cross-laminated timber or veneer plywood. The wood elements are generally glued under pressure. This is how timber bars, e.g. beams, are formed from timber layers, e.g. panels, glued together in parallel, whose main grain direction is arranged respectively parallel to one another. It is thus possible to build wooden bar or beam with correspondingly high traction and pressure forces in the grain direction of the panels, resp. the wooden bar. Similarly, panels are often formed of a plurality of timber layers glued in parallel, wherein the main grain direction of neighboring timber layers are arranged in parallel planes and perpendicular to one another. This achieves a high resistance to traction and pressure in both directions of the grain of the timber layers, since fiber bundles are formed in two orthogonal directions.

Planar adhesive connections such as for veneer plywood are not used nowadays for a front-end (also short side) connection of wood elements, since this connection transmits only a fraction of the traction forces of the wood in the longitudinal direction of the grain and thus cannot be used for structural connections. Generally, finger joints are used in such cases. The connecting surface is thus increased and an adhesive surface is created that is nearly parallel to the wood grain. The shape of the fingers, the adhesive and the bonding process are subject to strict standards. Due to these strict standards, it is not possible to produce such connections on the building site. On the other hand, the size of the building components is limited due to transportation, so that front-end connections cannot be achieved in timber construction via gluing due to the limitations of possibilities on the building site and during transport. Additionally, even this finger-joint connection itself is not sufficient for the requirements for parts that have to withstand high traction and pressure forces. A further disadvantage of the finger-joint connections or other overlapping connections is that the overlapping often makes it more difficult to insert large parts into the desired place.

Therefore, for front-end connections in structural timber construction, only connections with connecting means such as metal threaded screws or any other additional fastening means of metal are used which can transmit the high pressure and traction forces from one wood element onto the second wood element to be connected. However, these parts are very expensive to buy, complex to implement, visually disturbing, obstructive in terms of construction and partly difficult to achieve approval for, e.g. in the area of fire protection. Additionally, these metal elements have the disadvantage that they have to be inserted in both wood elements to be connected and thus can create new weak points in the wood.

EP039356 discloses a production method for obtaining timber panels, with uniformly thick colored adhesive strips. For this, panels are provided on their upper surface with uniformly spaced grooves that are filled with colored adhesive and glued with the next panel. By vertically sawing through the stack along the grooves, two-colored panels are obtained. It is also possible to glue together several wood components placed next to one another in one panel plane of the stack. This document however does not provide any solution for the front-end connection of two wood elements, since it does not show any front-end connection of two timber elements.

FR786001 shows a spaced-apart gluing of wood components. However, this document does not provide any solution for the front-end connection of two wood elements, since it shows no front-end connection of two timber elements.

REPRESENTATION OF THE INVENTION

It is an aim of the invention to create a component from two wood elements connected on their front ends/short sides, and a method for this connection, and a computer program for simulating the load capacity of such components, which overcome the disadvantages of the state of the art.

According to the invention, this aim is achieved by a component according to the independent claim. The component has a first wood element with at least a first main fiber direction and a second wood element with at least a second main fiber direction. The first wood element is adhesively bonded, on a first side cutting through the first main fiber direction, to a first side of the second wood element cutting through the second main fiber direction.

According to the invention, this aim is achieved by a method according to the independent claim. The method for connecting a first wood element with a second wood elfiberement has the following steps: arranging the first wood element facing towards a first side to a first side of the second wood element; adhesively bonding the first side of the first wood element with the first side of the second wood element; hardening the adhesive.

According to the invention, this aim is achieved by a computer program according to the independent claim.

The invention now has the advantage that through the front-end adhesive bonding of the first wood element with the second wood element, the forces in the first main fiber direction and second main grain direction are transmitted from the fibers of the first wood element onto the fibers of the second wood element. More accurately, the force that is transmitted through the fibers is introduced into the adhesive layer. The adhesive layer then further transmits the introduced force onto the neighboring wood element. A component is thus created through the connection of two wood elements that can be used as structural component. This thus allows timber components of any arbitrary size to be made at low cost. The size of the timber component thus producible is no longer limited by the growth size of the timber elements or by the maximal transportable size. The method for connecting is so simple and so stable vis-à-vis external influences such as for example humidity or temperature that such a connection becomes possible on location on the building site. Additionally, such a connection does not damage any of the timber elements through the introduction of steel parts. The inventive technique also makes it possible to do without any increase in the circumference or visual interference of the component from an externally affixed connecting means.

Further advantageous embodiments are indicated in the dependent claims.

In one embodiment, the first wood element and the second wood element are arranged in such a way that between the first side of the first wood element and the first side of the second wood element, there is a space that is filled with adhesive. This allows a simple gluing that does not need to be pressed.

In one embodiment, the space is suitable for filling the gap between the two timber elements with adhesive.

In one embodiment, the distance is greater than 0.3 mm.

In one embodiment, the adhesive connection between the first wood element and the second wood element forms a structural connection between the first wood element and the second wood element. Connections that are used in timber construction as structural parts are considered here to be structural connections. Preferably, such a structural connection in timber construction will withstand at least a traction force of at least 1 Newton per square millimeter. It is even better if the structural connection withstands traction forces of more than 3 Newton per square millimeter or more than 5 Newton per square millimeter or more than 10 Newton per square millimeter. Connections according to the invention have been measured that withstood traction forces of up to 20 Newton per square millimeter.

In one embodiment, the first main fiber direction encloses with the second main fiber direction an angle between 0° and 45°. It is thus possible to effectively direct forces around the curve.

In one embodiment, the first main fiber direction is placed parallel to the second main fiber direction.

In one embodiment, the first wood element on the first side in the first main fiber direction does not overlap the second wood element on the first side.

In one embodiment, the first wood element has on the first side at least one area with the first main fiber direction and has at least one area with a third main fiber direction, and the second wood element has on the first side at least one area with the second main fiber direction and has at least one area with a fourth main fiber direction, wherein the area of the first wood element with the first main fiber direction is adhesively bonded to the area of the second wood element with the second main fiber direction. Forces in the component can thus be transmitted along each main fiber direction of both wood elements. Thanks to the gluing of the area of the first main fiber direction with the area of the second main fiber direction, forces from the fibers of the area of the first main fiber direction are transmitted onto the fibers of the area of the second main fiber direction.

In one embodiment, the area of the first wood element with the third main fiber direction is adhesively bonded with the area of the second wood element with the fourth main fiber direction. Thanks to the gluing of the area of the third main fiber direction with the area of the fourth main fiber direction, forces from the fibers of the area of the third main fiber direction are transmitted onto the fibers of the area of the fourth main fiber direction.

In a first embodiment, the first wood element has alternatively a first timber layer and a second timber layer, wherein the first timber layer on the first side corresponds to the area with the first main fiber direction and the second timber layer on the first side corresponds to the area with the third main fiber direction. In one embodiment, the second wood element alternatively has a first timber layer and a second timber layer, wherein the first timber layer on the first side corresponds to the area with the second main fiber direction and the second timber layer on the first side corresponds to the area with the fourth main fiber direction. An adhesive bonding of such layered veneer plywood boards or cross-laminated timber panels can result in very large panels that can transmit the forces in the two directions of the fibers also beyond the adhesive bonding. Thanks to the gluing of fibers with the same main fiber direction, the forces in each layer are transmitted over the gluing.

In one embodiment, the first main fiber direction is arranged at a right angle to the third main fiber direction and/or the second main fiber direction is arranged at a right angle to the fourth main fiber direction. This arrangement has the advantage that the two directions of force transmission are orthogonal and thus an optimum transmission of forces in the plane is achieved.

In one embodiment, the area with the first main fiber direction is formed parallel to the area with the third main fiber direction and/or the area with the second main fiber direction is formed parallel to the area with the fourth main fiber direction.

In one embodiment, the first wood element is a grid box and/or the second wood element is a grid box.

In one embodiment, the first side of the first wood element is smoothed or filled in and/or the first side of the second wood element is smoothed or filled in. This has the advantage that the surface to be glued is smooth prior to gluing. This reduces the probability of bubbles being generated. Bubbles reduce the glued surface and thus the quality of the connection. Smoothing or filling in the first side(s) thus increases the quality of the connection.

In one embodiment, the gap between the wood elements has one of the following forms: a plane surface, a concave shape, a concave triangular or multi-sided shape, a plane surface that is arranged at a right angle to the first and/or second main fiber direction, a plane surface that forms a non-orthogonal angle to the first and/or second main fiber direction. Additionally to the gluing effect, such forms can result in the hardened adhesive in the gap becoming wedged.

In one embodiment, the first side of the first wood element and the first side of the second wood element form a concave shape and a spring is placed in the hollow recess formed by the first sides of the first and second wood element. Thanks to the spring, the quantity of the adhesive to be filled in can be reduced. When the strength of the spring is greater than that of the adhesive, the strength of the connection is increased.

In one embodiment, prior to filling the space/gap with adhesive, the open sides of the space between the first side of the first wood element and the first side of the second wood element are sealed.

In one embodiment, all open sides of the gap are sealed and the adhesive is filled in through a hole in the seal. There is preferably a further hole, through which the displaced air can escape from the gap. The hole is preferably placed in the seal at the uppermost point, so that air can escape until the very end. Preferably, the adhesive is filled in under pressure. In one example, the hole is placed on the bottom side of the seal.

In one embodiment, the seal is achieved through filler material.

In one embodiment, the adhesive has two components that are mixed prior to or whilst being filled into the gap.

In one embodiment, the volume enclosed between the first sides of the first and second wood element is calculated, the volume of the adhesive filled in is measured, the calculated volume is compared with the measured volume and a statement is made about the quality of the connection on the basis of the comparison. The process allows a very simple ad effective control of the quality of the connection.

In one embodiment, the volume enclosed between the first sides of the first and second wood element is subdivided in sub-volumes sealed vis-à-vis one another, the volume of a first sub-volume enclosed between the first sides of the first and second wood element is calculated, the volume of the adhesive filled into the first sub-volume is measured, the calculated volume is compared with the measured volume, and a statement is made about the quality of the connection on the basis of the comparison. Additionally subdividing the sections makes it possibly to determine the exact location of the weak points in large surfaces to be glued.

BRIEF DESCRIPTION OF THE FIGURES

The invention will be explained in more detail on the basis of the attached figures, wherein:

FIG. 5 an embodiment of a wood element of a component of the third embodiment;
FIG. 5A a cross section through the component of the third embodiment.

WAYS FOR EXECUTING THE INVENTION

Figure 1:
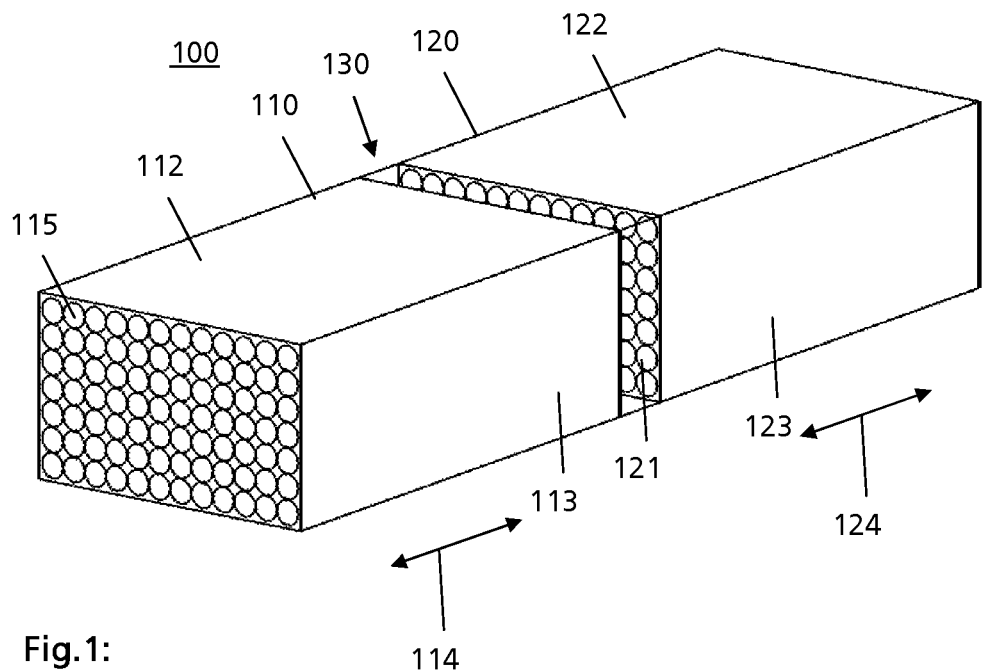
FIG. 1 a first embodiment of a component.

FIG. 1 shows a first embodiment of a component 100. The component 100 has a first wood element 110 and a second wood element 120.

The first wood element 110 has a first side (not shown) facing the second wood element 120, a second side 112 at a right angle to the first and to a third side, and the third side 113 at a right angle to the first and second side. A fourth side (not represented) is placed opposite the second side 112 on the side of the wood element 110 parallel to the second side 112. A fifth side (not represented) is placed opposite the third side 113 on the side of the wood element 100 parallel to the third side 113. The wood element 110 thus forms a rectangular block shape. The invention is however not limited to wood elements in rectangular block shape but to every geometrical and non-geometrical shape, with a first side to be glued with the second wood element, is suitable as first wood element. The first wood element 110 has fibers 115, which are drawn in conventionalized fashion as tubes in FIG. 1. The fibers 115 in the wood element 110 have the main fiber direction 114, which runs parallel to the second side 112 and to the third side 113 and is orthogonal to the first side. The main fiber direction 114 is preferably at a right angle to the first side, here executed as a plane surface, whilst the alignment of the main fiber direction 114 to the other sides is irrelevant to the invention. But other angles between the main fiber direction 114 and the first side are also possible.

The second wood element 120 has a first side 121, a second side 122, a third side 123 and a main fiber direction 124. In the component 100, the second wood element 120 is identical at least in its basic structure to the previously described first wood element 110, so that a repetition of the description is avoided.

In the component 100, the first wood element 110 and the second wood element 120 are arranged in such a way that the first side of the first wood element is placed parallel to the first side 121 of the second wood element 120. In the component 100, the first side of the first wood element 110 has the same size as the first side 121 of the second wood element 120, and the first wood element 110 and the second wood element 120 are arranged in such a way that the first wood element 110 is aligned flush to the second wood element 120, i.e. the first side of the first wood element 110 does not project above the first side 121 of the second wood element 120. However, the invention is not limited to such flush connections.

The first wood element 110 is placed to the second wood element 120 in such a manner that there is a space between the first side of the first wood element 110 and the first side 121 of the second wood element 120. The space should be large enough so that a used adhesive can be placed in the gap formed through the space between the first side of the first wood element 110 and the first side 121 of the second wood element 120. The gap should be suitable to allow the adhesive to spread in the whole gap volume and fill the latter before it starts to harden. There is no upper limit for this space. Studies of adhesive connections with different distances have shown that the force per surface of the connection between the first wood element 110 and the second wood element 120 does not depend on the size of the space, inasmuch as the gap is filled with adhesive. This means on the first hand that there is no upper limit for the size of the gap. On the other hand, it is not relevant for the adhesive connection of the invention that the first side of the first wood element 110 and the first side 121 of the second wood element 120 are parallel. In an alternative component, the two first sides could also be placed at an angle, so that the distance between the two first sides increases in one direction and the first wood element 110 encloses an angle with the second wood element 120. Tests up to 45° between the first main fiber direction 114 and the second main fiber direction 124 have yielded satisfactory results in this respect. Unlike in the timber laminating connection of the state of the art, the adhesive in the invention is filled in, whilst in the state of the art the connection is achieved by pressing the two wood elements together. Such connections through pressing may not have distances greater than 0.3 mm. For the invention, on the other hand, it is precisely an advantage if the distance between the first wood element 110 and the second wood element 120 is greater than 0.3 mm. At cold temperatures in particular, it is advantageous if the distance is greater, preferably greater than 1 mm, even better greater than 3 or 5 mm.

Figure 2:
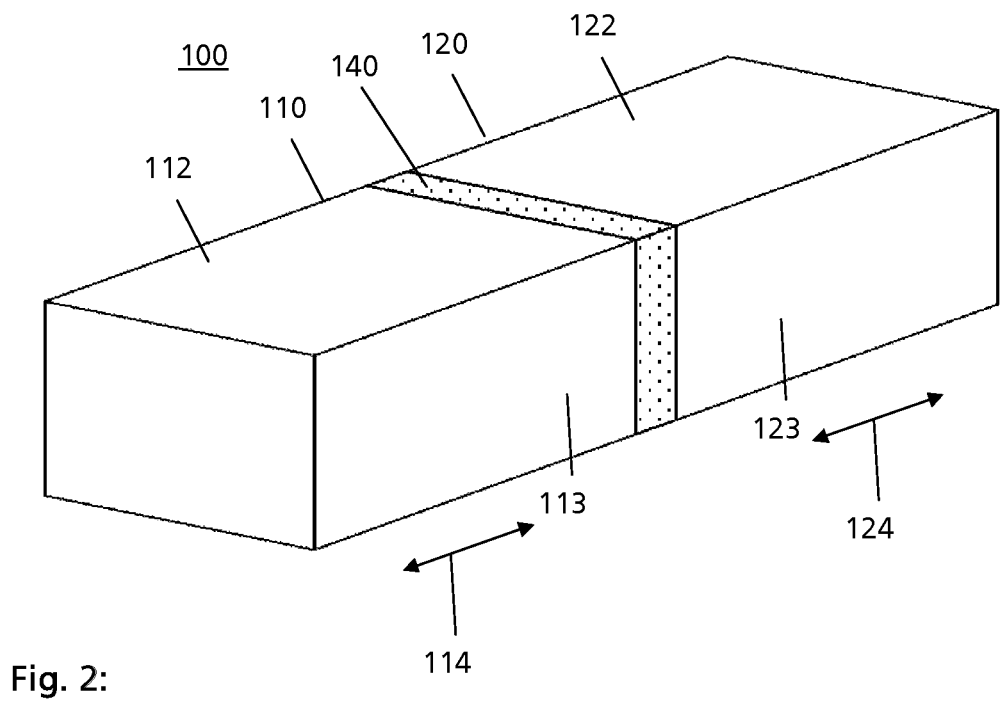
FIG. 2 the first embodiment of a component.

FIG. 2 also shows the component 100 of the first embodiment. The fibers 115 are no longer shown in FIG. 2, yet are still present. In FIG. 2, the gap 130 is now filled with adhesive 140, which creates a structural connection between the first wood element 110 and the second wood element 120. To glue the first wood element 110 with the second wood element 120, the open sides of the gap 130 shown in FIG. 1 are sealed. This is achieved for example through filling-in of the open sides. Through a small opening in the filler material, the adhesive is filled in the gap. The adhesive can also be pressed under light pressure into the gap 130, so that possibly in the direction of gravity the areas of the gap 130 that are above the opening can be filled with adhesive. As adhesive, a two-component adhesive is preferably used, whose two components are mixed upon being filled into the gap 130. By mixing the two components, the adhesive starts to harden. After hardening of the adhesive, there is a structural connection between the first wood element 110 and the second wood element 120. The adhesive PURBOND CR 421 from the Swiss company Purbond for example was tested as adhesive. This two-component polyurethane cast resin has been approved by the German Institute of Structural Engineering under registration number Z-9.1-707 for the gluing of steel rods in structural timber components. Using this adhesive, a connection between the first wood element 110 and the second wood element 120 was measured with traction resistances of up to 20 Newton per square millimeter (N/mm2).

In a modification of the component 100, the first side of the first wood element 110 and the first side of the second wood element 120 were smoothed prior to gluing, so that the surfaces to be glued are smooth. The formation of bubbles in the adhesive is thus prevented and the glued surface is increased, so that a greater load capacity of the connection is achieved. Alternatively, the formation of bubbles can also be prevented by filling-in the surfaces to be glued. Such a modification is suitable not only for the component 100 but also for the embodiments of the component described hereinafter and embodiments of the invention not described herein.

Figure 3:
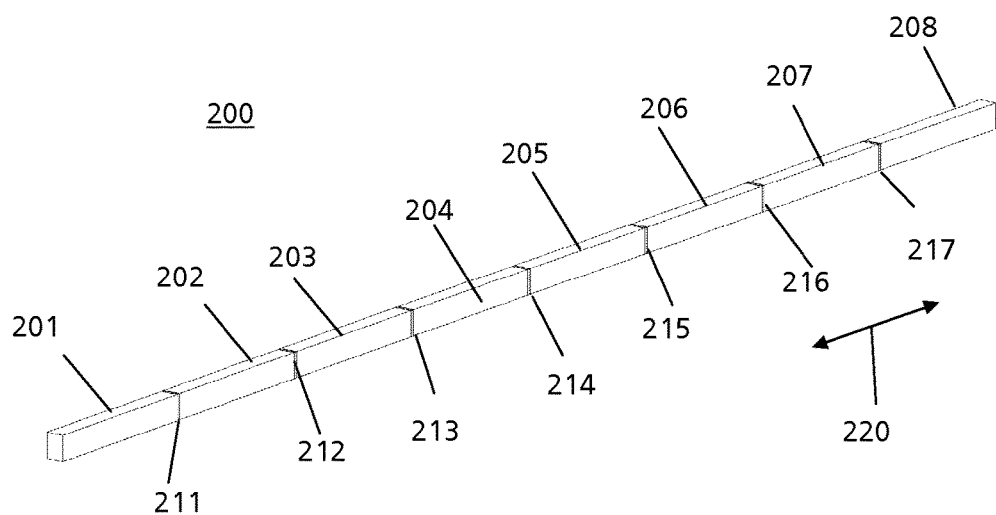
FIG. 3 a second embodiment of a component.

FIG. 3 shows a timber bar 200 as second embodiment of a component. The timber bar 200 has eight wood elements 201, 202, 203, 204, 205, 206, 207, 208. Each wood element has a main fiber direction 220. Each wood element is preferably formed as a rectangular block shape. In this example, the longest side of the rectangular block shape is formed in the direction of the main fiber direction 220. The wood elements 202 to 207 placed in the middle are connected at their extremities in the main fiber direction 220 by means of an adhesive bonding 211 to 217, as described in FIGS. 1 and 2, with the respective neighboring wood element 201 to 208. It is thus possible with the inventive connection to generate a length of timber of any arbitrary length, whose main fiber direction runs in the longitudinal direction of the pole. By gluing at the extremities of each wood element 201 to 208, the strength of the fibers is transmitted onto the fibers of the neighboring wood elements. Simultaneously, the individual wood elements 201 to 208 do not have to be weakened by the insertion of an iron element or their circumference increased by external connecting elements. The gluing is easy and can also take place on location on the building site. It is thus possible to transport the wood elements 201 to 208 in transportable size to the building site and glue them together to the length of timber of the desired size. The gluing has yielded very good loading capacity values even when hardening at −10° C., so that this gluing would be possible even in winter.

The wood elements 110 and 120 from FIGS. 1 and 2 and the wood elements 201 to 208 from FIG. 3 have each a main fiber direction. The wood elements 110, 120, 201 to 208 can be made of a single piece of wood, e.g. massive wood resp. glue-laminated timber or as veneer plywood, cross-laminated timber or OSB. In the veneer resp. cross-laminated timber, wood beams or wood panels can be adhesively bonded in parallel to their main fiber direction, forming together a wood element 110, 120, 201 to 208.

Figure 4:
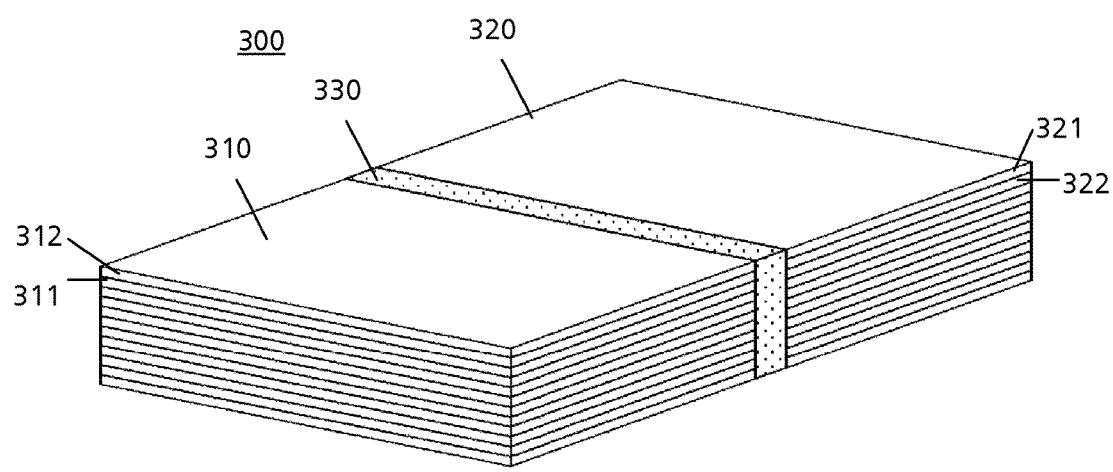
FIG. 4 a third embodiment of a component.

FIG. 4 shows a third embodiment of a component 300. The component 300 shows a first wood element 310 and a second wood element 320. The first wood element 310 is adhesively bonded on a first side with a first side of the second wood element 320 with an adhesive layer 330, as described in FIGS. 1 and 2 in relation to component 100.

The first wood element has a plurality of first timber layers 311 and a plurality of second timber layers 312, wherein a neighboring timber layer of a first timber layer 311 is a second timber layer 312 and vice-versa, so that the first timber layer 311 and the second timber layer 312 always alternate in the wood element 310. FIG. 5 shows by way of example four layers of the first wood element 310. The first timber layer 311 has a first main fiber direction 313, the second timber layer 312 a third main fiber direction 314, which is preferably at a right angle to the first main fiber direction 313. Both main fiber directions 313 and 314 are placed in the layer plane. The first main fiber direction 313 or the third main fiber direction 314 is preferably arranged perpendicular to the first side of the first wood element 310. Alternatively, the first main fiber direction 313 or the third main fiber direction 314 can also be arranged at another angle between 90° and 45° to the first side of the first wood element 310.

FIG. 5A shows a cross section through the component 300, that is perpendicular to the glued gap 330. The second wood element 320 also has a plurality of first timber layers 321 and a plurality of second timber layers 322, wherein a neighboring layer of a first timer layer 321 is a second timber layer 322 and vice-versa, so that the first timber layer 321 and the second timber layer 322 always alternate in the second wood element 320. The first timber layer 321 has a second main fiber direction 323 and the second timber layer 322 has a fourth main fiber direction that is at a right angle to the second main fiber direction 323. Both main fiber directions of the second wood element 320 are arranged in the layer plane. The second main fiber direction 323 or the fourth main fiber direction is preferably arranged perpendicular to the first side of the second wood element 320. Alternatively, the second main fiber direction 313 or the fourth main fiber direction 314 can also be arranged at another angle between 90° and 45° to the first side of the second wood element 320.

The first wood element 310 and the second wood element 320 are now preferably arranged such that the first layers 311 of the first wood element 310 are adhesively bonded with the first layers 321 of the second wood element 320 and the second layers 312 of the first wood element 310 are adhesively bonded with the second layers 322 of the second wood element 320. This means that the projection of a first layer 311 of the first wood element 310 in the layer plane meets again a first layer 321 of the second wood element 320. The same applies for the second layers 312 and 322. The first main fiber direction 313 and the second main fiber direction 323 are preferably parallel and the third main fiber direction 314 and the fourth main fiber direction are preferably also parallel. Thus, in each layer, the main fiber direction is maintained over neighboring wood elements 310 and 320, and thus traction and pressure forces are transmitted optimally in the fiber direction over neighboring wood elements 310 and 320. Due to the main fiber directions arranged at a right angle in neighboring timber layers, each wood element 310 and 320 can transmit forces in two orthogonal directions. By continuing the fiber directions in each layer into the neighboring wood element 310 and 320 through the adhesive layer 330, the component 300, despite the adhesive connection, can withstand forces in two orthogonal directions throughout the entire component.

Figure 6:
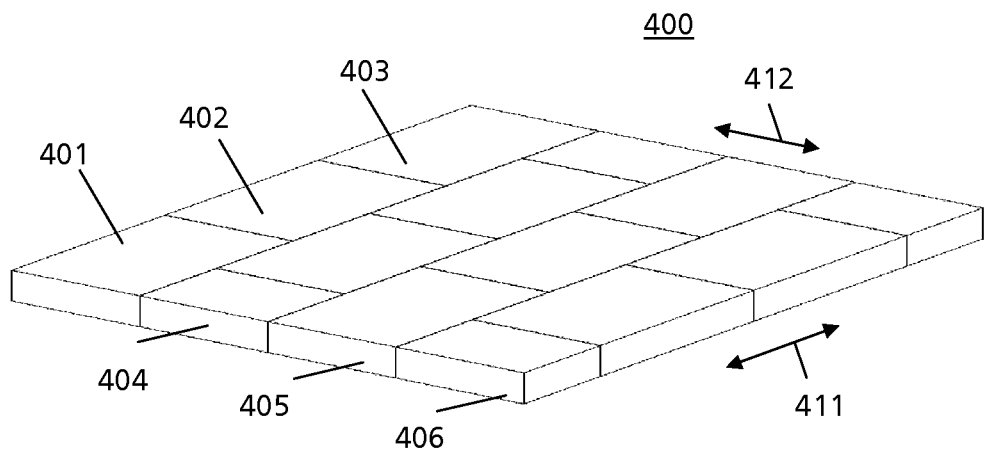
FIG. 6 a fourth embodiment of a component.

FIG. 6 now shows the possibility of constructing panels of any arbitrary size as fourth embodiment of a component 400 that can transmit forces in two orthogonal directions. Each wood element 401, 402, 403, 404, 405, 406 . . . has a layer structure like the wood elements 310 and 320. Each wood element 401, 402, 403, 404, 405, 406 . . . has alternatingly a first layer and a second layer, respectively. In the first layer, there is a first main fiber direction 411 that is arranged perpendicular to a second main fiber direction 412 in the second layer. The first layers of a wood element 401, 402, 403, 404, 405 406 . . . are adhesively bonded with the corresponding first layers of the neighboring wood elements, and the second layers accordingly with the second layers. In this way, in each first layer, forces are transmitted in the direction of the first main fiber direction 411 over the wood elements 401, 402, 403, 404, 405, 406 . . . Simultaneously, in the second layers, forces are transmitted in the direction of the second main fiber direction 412 over the wood elements 401, 402, 403, 404, 405, 406 . . . It is thus possible to produce a panel 400 of any arbitrary size that can transmit forces well in two orthogonal directions 411 and 412.

Figure 6A:
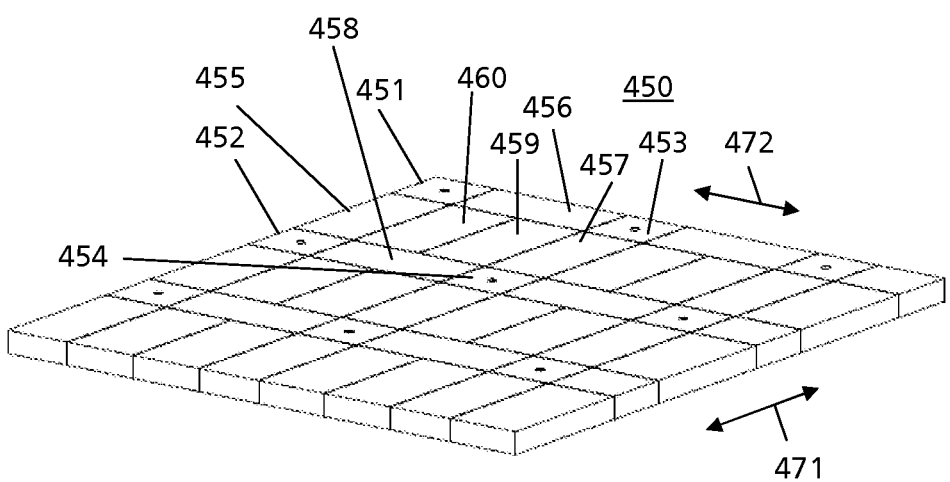
FIG. 6A a further embodiment of a component.

FIG. 6A now shows a further embodiment of a component 450. The component 450, like the component 400, also forms a panel that can transmit forces in two orthogonal directions. Each wood element 451, 452, 453, 454, 455, 456 . . . has a layer structure like the wood elements 310 and 320. Each wood element 451, 452, 453, 454, 455, 456 . . . has alternatingly a first layer and a second layer, respectively. In the first layer, there is a first main fiber direction 471 that is arranged perpendicular to a second main fiber direction 472 in the second layer. The first layers of a wood element 451, 452, 453, 454, 455, 456 . . . are adhesively bonded with the corresponding first layers of the neighboring wood elements, and the second layers accordingly with the second layers. In this way, in each first layer, forces are transmitted in the direction of the first main fiber direction 471 over the wood elements 451, 452, 453, 454, 455, 456 . . . Simultaneously, in the second layers, forces are transmitted in the direction of the second main fiber direction 472 over the wood elements 451, 452, 453, 454, 455, 456 . . . It is thus possible to produce a panel 450 of any arbitrary size that can transmit forces well in two orthogonal directions 471 and 472.

The component 450 is exceedingly well suited as interstory floor/ceiling slab. The wood elements 451, 452, 453, 454, 455, 456 . . . designated as prop heads and the unnumbered wood elements with the recess respectively rest on a support. Between two prop heads is a wood element 455, 456, 457, 458 etc. that is called first auxiliary supporting structure. Between two wood elements 455, 456, 457, 458 etc. of the first auxiliary supporting structure is the second auxiliary supporting structure. The second auxiliary supporting structure between four wood elements 455, 456, 457, 458 etc. of the first auxiliary supporting structure has two wood elements 459 and 460. Since the forces are transmitted from the second auxiliary supporting structure onto the first auxiliary supporting structure, from the first auxiliary supporting structure onto the prop heads and from there onto the supports, the prop heads are exposed to higher forces than the first auxiliary supporting structure and the first auxiliary supporting structure is subject to higher forces than the second auxiliary supporting structure. It can therefore be advantageous to use different timber with different maximum load capacities for the prop heads, first auxiliary supporting structure and second auxiliary supporting structure.

Since the first layer of each and every wood element 451, 452, 453, 454, 455, 456, 457, 458, 459, 460 . . . of the component 450 always has the first main fiber direction 471 and the second layer of each and every wood element 451, 452, 453, 454, 455, 456, 457, 458, 459, 460 . . . of the component 450 always has the second main fiber direction 472, the forces of each layer are transmitted through the adhesive connections of the neighboring wood elements 451, 452, 453, 454, 455, 456, 457, 458, 459, 460 . . . through the entire panel. A component is thus produced that has a similar stability to massive wood, has the fibers running in two directions, and forms a panel of any arbitrary size.

Figure 7:
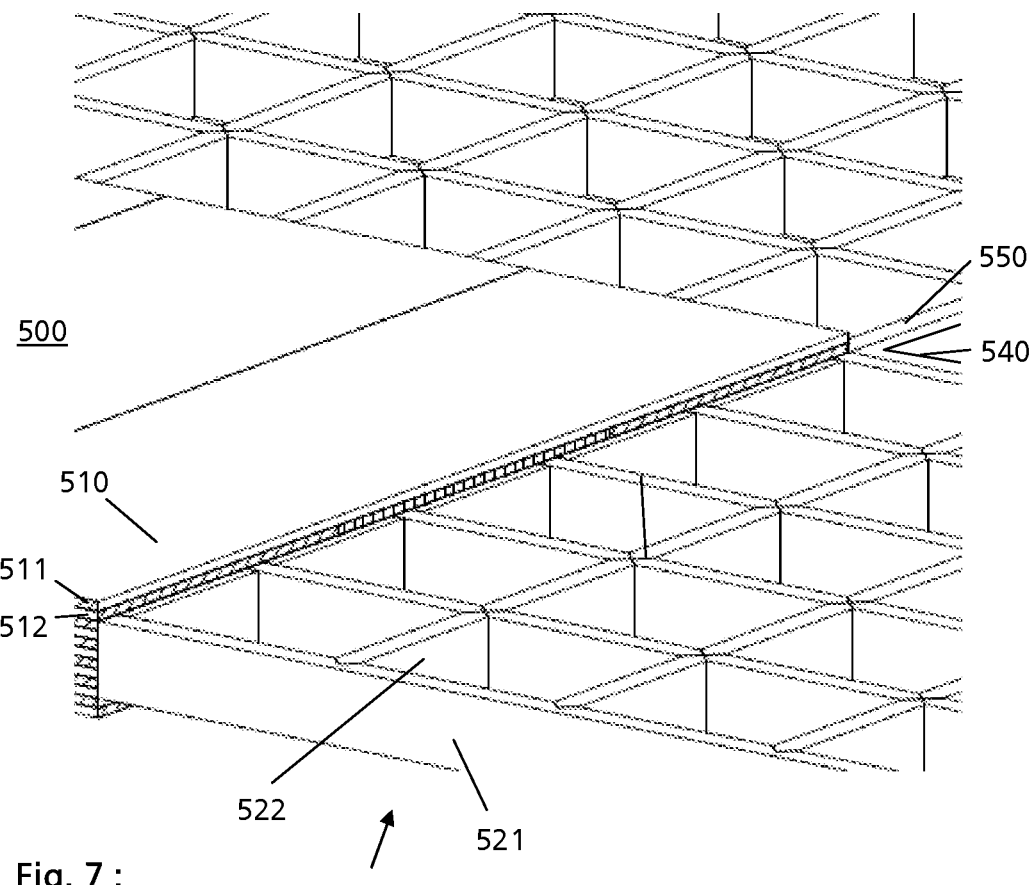
FIG. 7 a fifth embodiment of a component.
Figure 8:
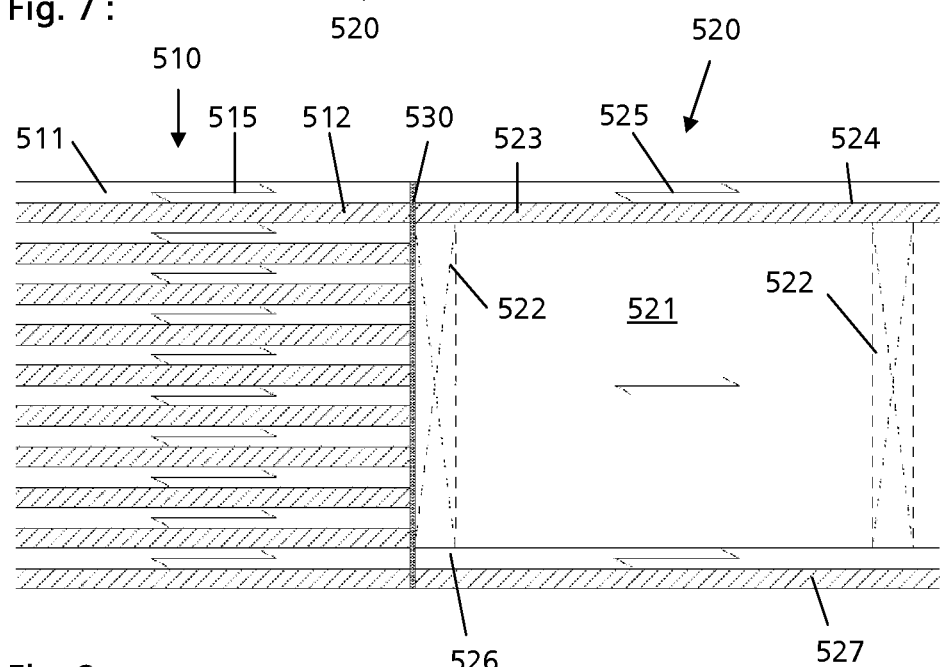
FIG. 8 a cross section through the fifth embodiment of a component.

FIGS. 7 and 8 show a fifth embodiment of a component 500 having a first wood element 510, a second wood element 520, a third wood element 540 and a fourth wood element 550. FIG. 7 shows a three-dimensional view of the component 500. FIG. 8 shows a cross section through the two wood elements 510 and 520 in the component 500. In contrast to the first to fourth embodiments, the first wood element 510 and the second wood element 520 are here not built the same way.

The first wood element 510 has a layer structure with alternatingly arranged first timber layers 511 and second timber layers 512 with orthogonal first main fiber directions 515 and third main fiber directions as the wood elements 310, 320, 301, 402, 403 . . .

The second wood element 520 has a box-shaped structure. The second wood element 520 has first cross members 521 and second cross members 522 that are arranged at a right angle to the first cross members 521. The first cross members 521 and the second cross members 522 are also called bulkheads. This makes it possible to create a stable and light box structure, also called grid box. The grid box is covered on one upper side by a second timber layer 523, which is not represented in FIG. 7 but can be seen in FIG. 8. The second timber layer 523 has a fourth main fiber direction in the image plane of FIG. 8 and thus parallel to the adhesive bonding layer 530 between the first and the second wood element 510 and 520. On the second timber layer 523, further timber layers can be arranged, wherein the neighboring timber layer has respectively a main fiber direction orthogonal in the layer plane. In the component 500, a first timber layer 524 is arrange don the second timber layer 523, which has a second main fiber direction 525 that is arranged perpendicular to the adhesive bonding layer 530. The grid box is covered on a bottom side by a further timber layer 526, which is not represented in FIG. 7 but can be seen in FIG. 8. The first timber layer 526 has the second main fiber direction 525 that runs parallel to the first main fiber direction 515 and perpendicular to the third and fourth main fiber direction. Further timber layers can be arranged on the first timber layer 526, wherein the neighboring timber layer has respectively an orthogonal main fiber direction. In the component 500, a second timber layer 527 is arranged on the further first timber layer 526, which has the fourth main fiber direction. The first cross members 521 have the second main fiber direction 525. The second cross members 522 have the fourth main fiber direction.

The box-shaped structure of the second wood element 520 has the advantage that the wood element 520 more material-saving and lighter. Such a wood element 520 is especially advantageous if a lower force needs to be transmitted. The forces on the wood element 520 are transmitted through the first cross members 521 and the second timber layers 524 and 526 in the first main fiber direction and in the area of the first layers 511 of the first wood element 510 onto the first wood element 510. Simultaneously, forces in the second main fiber direction are transmitted over the second timber layers 523 and 526 onto the second timber layers of a neighboring wood element 540. The neighboring wood element 540 is built like the second wood element 520. It is thus possible in this embodiment to transmit forces in two orthogonal directions. IN this embodiment, the main fiber of the second cross member 522 is interrupted, since the second cross member is not directly glued with the second cross member 522 of the neighboring wood element 540.

In the component 500, there are areas of the first side of the first wood element 510 with the first main fiber direction 515 that are adhesively bonded with the areas of the first side of the second wood element 520 with the second main fiber direction 525. These include for example the first layers 511 of the first wood element 510 that are adhesively bonded with the first layers 524 and 526 of the second wood element 520. These also include the area of the first timber layers 511 of the first wood element 510 that are adhesively bonded with the extremities of the first cross members 521. In the component 500 there are areas of the first side of the first wood element 510 with the third main fiber direction that are adhesively bonded with areas of the first side of the second wood element 520 with the fourth main fiber direction. These include for example the second layers 512 of the first wood element 510 that are adhesively bonded with second layers 523 and 527 of the second wood element 520. These also include the area of the second timber layers 512 of the first wood element 510 that are adhesively bonded with the sides of the second cross member 522. Due to the different construction, there are lastly areas of the first side of the first wood element 510 with the first main fiber direction 515 that are adhesively bonded with areas of the first side of the second wood element 520 with the fourth main fiber direction. These include the area of the first timber layers 511 of the first wood element 510 that are adhesively bonded with the sides of the second cross member 522. No force is transmitted via these glued areas with main fiber areas arranged at a right angle to one another. Due to the different construction, there are lastly areas of the first side of the first wood element 510 with the third main fiber direction that are adhesively bonded with areas of the first side of the second wood element 520 with the second main fiber direction 525. These include the area of the second timber layers 512 of the first wood element 510 that are adhesively bonded with the extremities of the first cross members 521. No force is transmitted via these glued areas with main fiber areas that are arranged at a right angle to one another.

The third wood element 540 and the fourth wood element 550 are built like the second wood element. The fourth wood element 550 is adhesively bonded with the first wood element 510 in similar fashion to the second wood element. The third wood element 540 is adhesively bonded with the second wood element 520 and the fourth wood element 550.

Differently constructed wood elements 510 and 520, 540, 550 make sense in situations, as represented in FIG. 7, in which the forces of several wood elements 520, 540, 550 are to be transported away over a wood element 510, e.g. to a truss that is placed below the wood element 510. The wood elements 520, 540 and 550 therefore need to transmitted less force than the first wood element 510. This is why the first wood element 510 is made here in massive manner as veneer plywood, whereas the further wood elements 520, 540 and 550 are made as a grid box.

Figure 9:
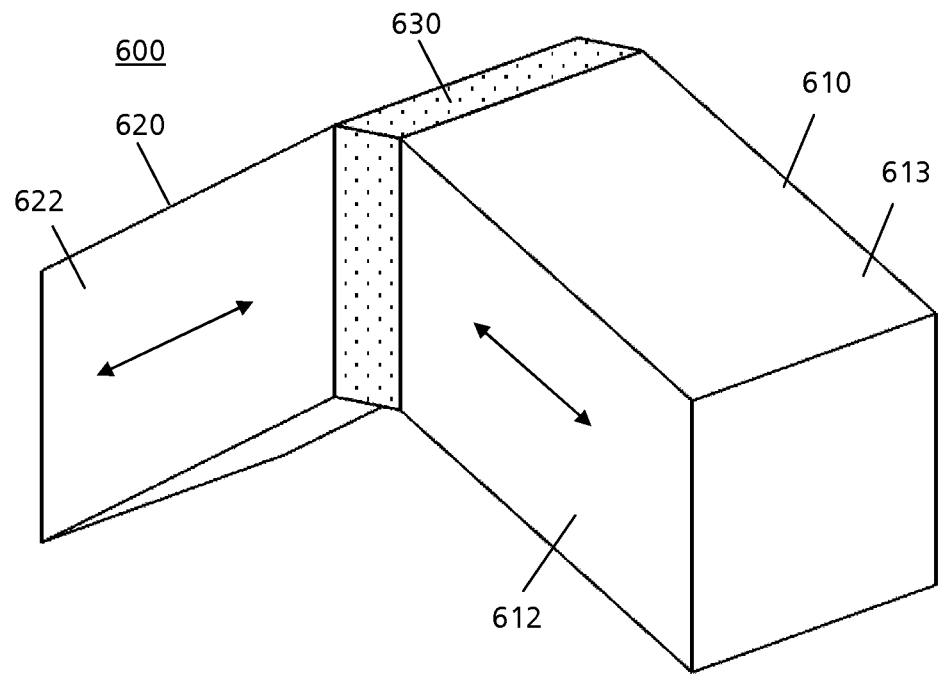
FIG. 9 a sixth embodiment of a component.

FIG. 9 shows a sixth embodiment of a component 600. The component 600 has a first wood element 610 and a second wood element 620.

The first wood element 610 has a first side, not visible, a second side 612 and a third side 613. The second and third side 612 and 613 are arranged at a right angle to one another and a first main fiber direction in the first wood element 610 is arranged parallel to the second and third side 612 and 613. The first side of the first wood element has a non-orthogonal angle to at least one of the second side 612 and of the third side 613. In this component 600, the first side is at a right angle to the second side 612 and has a non-orthogonal angle with the third side 613. Thus, the angle between the first and third side corresponds to the angle between the first side and the first main fiber direction.

The second wood element 620 has a first side, not visible, a second side 622 and a third side, also not visible. The second and third side 622 are arranged at a right angle to one another and a second main fiber direction in the second wood element 620 is arranged parallel to the second and third side 612 and 613. The first side of the second wood element 620 has a non-orthogonal angle to at least one of the second side 612 and of the third side 613. In this component 600, the first side is at a right angle to the second side 622 and has a non-orthogonal angle with the third side. In this embodiment, the angle is constructed like in the first wood element 610. The angle between the first and third side thus corresponds to the angle between the first side and the second main fiber direction.

The first sides of the first wood element 610 and of the second wood element 620 are adhesively bonded together as described in relation to FIGS. 1 and 2 and to the component 100. The forces are thus transmitted over an angle. Preferably, the angle between the first main fiber direction and the second main fiber direction should not exceed 45°.

Figure 10:
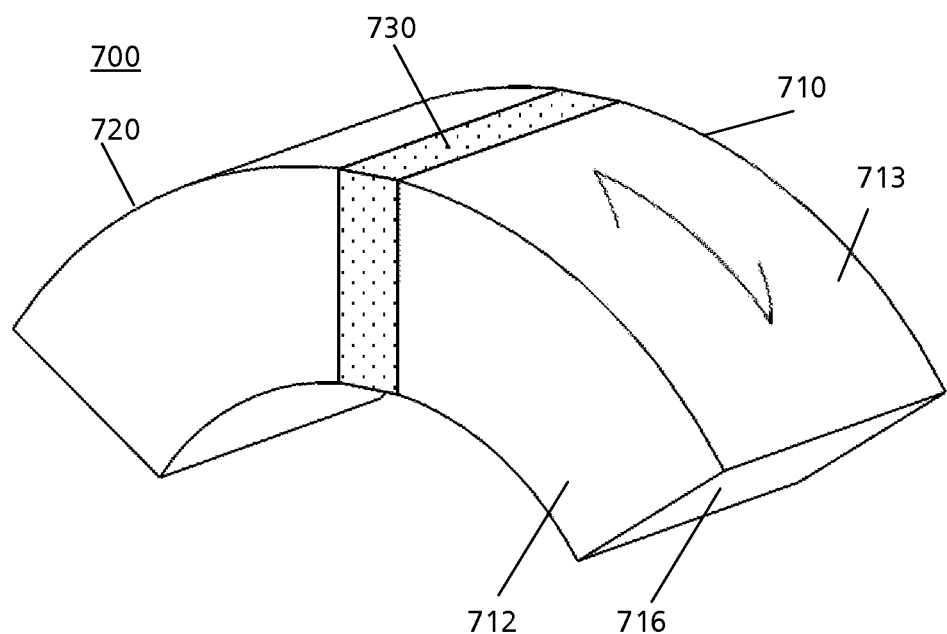
FIG. 10 a seventh embodiment of a component.

FIG. 10 shows a seventh embodiment of a component 700. The component has a first wood element 710 and a second wood element 720.

The first wood element 710 has a first side turned towards the second wood element, a second side 712, a third side 713, a fourth side arranged opposite the second side 712, a fifth side arranged opposite the third side 713, and a sixth side arranged opposite the first side. The second and fourth sides are respectively curved with the same curvature but with different radii. This is preferably a circular or parabolic curvature, so that the second and fourth side form respectively an angular section of a lateral surface of a cylinder. The third and fifth side is arranged in parallel. The first wood element 710 has a first main fiber direction that runs parallel to the second and third side. This means that the first main fiber direction is also curved and follows the second and fourth side. The main fiber direction cuts the first and sixth side respectively at a right angle.

The second wood element 720 is constructed in identical fashion to the first wood element 710, so that the also curved second main fiber direction of the second wood element 720 also cuts at a right angle the first side facing the first wood element 710.

The first wood element 710 is adhesively bonded on the first side with the first side of the second wood element 720, as has been described in relation to the component 100.

This means that with the inventive technique, hollow cylinders of any arbitrary size can be made of timber and which transmit the force in the circumferential, longitudinal and torsional direction. By stringing together such hollow cylinders, it would be possible to produce tubes or hollow supports of timber. It would also be conceivable to produce the first wood element 710 and the second wood element of cross-laminated timber or of veneer plywood. In the first wood element 710, there could be first layers with the first main fiber direction and neighboring second layers with a third main fiber direction that run perpendicular to the first main fiber direction and parallel to the layer plane. In the wood element 710, the layer plane could be curved and be arranged parallel to the second side 712. Thus, when implemented as tubes, a transmission of forces could be achieved in circumferential and tube-longitudinal direction.

FIGS. 11A to F show different shapes of the gap filled with adhesive between the first wood element and the second wood element.

Figure 11:
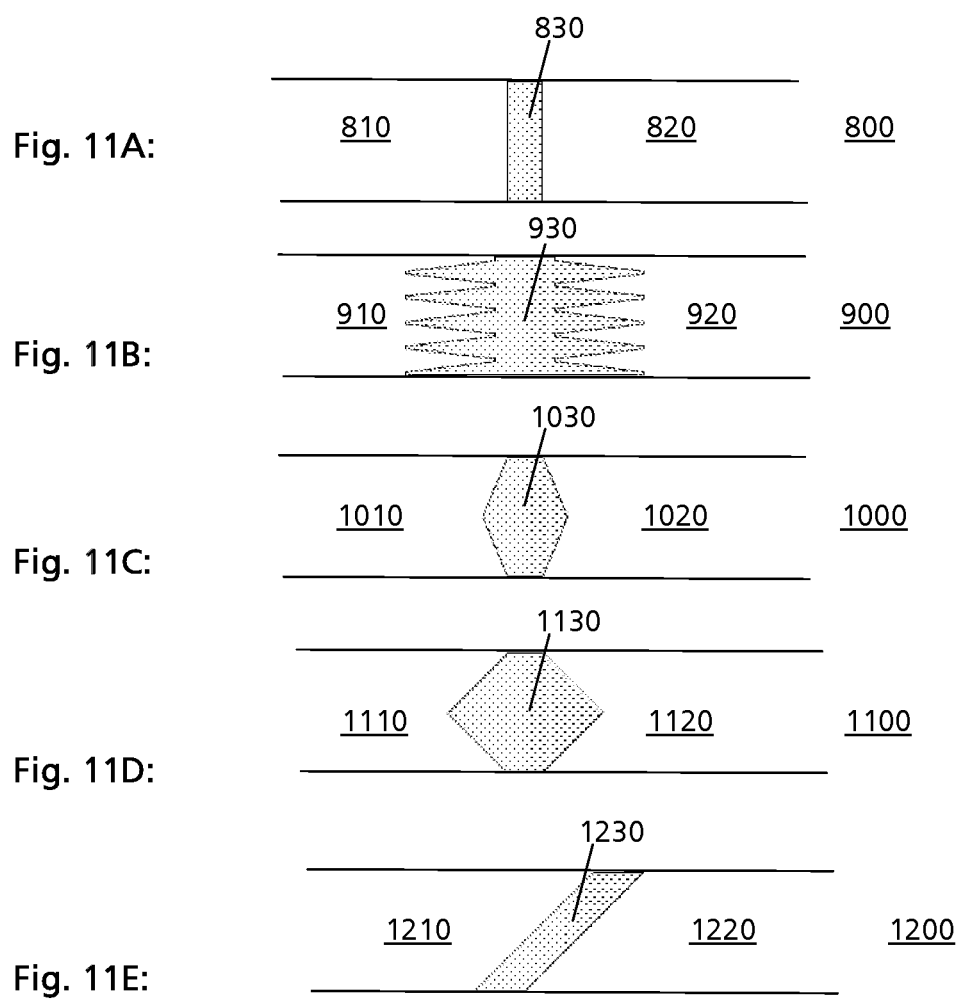
FIG. 11A an eighth embodiment of a component.
FIG. 11B a ninth embodiment of a component.
FIG. 11C a tenth embodiment of a component.
FIG. 11D an eleventh embodiment of a component.
FIG. 11E a twelfth embodiment of a component.

FIG. 11A shows a component 800 with a first wood element 810 and a second wood element 820. Here, the first side of the first wood element 810 and the first side of the second wood element 820 are executed as flat surface, arranged at a right angle to the second and third side of the first and second wood element 810 and 820. This results therefore in a gap shape 830 as in the first to seventh exemplary embodiment of the invention.

FIG. 11B shows a component 900 with a first wood element 910 and a second wood element 920. In this case, the first side of the first wood element 910 and the first side of the second wood element 920 is made respectively as finger joints. Unlike finger-joint connections of the state of the art, the finger joints here do not overlap and also don't engage with one another. This has the advantage that the hardened adhesive becomes wedge-shaped with the first wood element 910 and the second wood element 920 in the gap 930. Yet the first wood element 910 does not have to be threaded into the second wood element 920, which can possibly be difficult in the case of large wood elements.

FIG. 11C shows a component 1000 with a first wood element 1010 and a second wood element 1020. Here, the first side of the first wood element 1010 and the first side of the second wood element 1020 are respectively concave, in this case executed in triangular shape. This corresponds to a keyway. This has the advantage that the hardened adhesive becomes wedged with the first wood element 1010 and the second wood element 1020 in the gap 1030. Yet the first wood element 1010 does not have to be threaded into the second wood element 1020, which can possibly be difficult in the case of large wood elements.

FIG. 11D shows a component 1100 with a first wood element 1110 and a second wood element 1120. In this case, the first side of the first wood element 1110 and the first side of the second wood element 1120 are respectively concave, here executed in triangular shape. This corresponds to a keyway. In contrast to FIG. 11C, the keyway is made lower. This has the advantage that the hardened adhesive becomes wedged with the first wood element 1110 and the second wood element 1120 in the gap 1130. Yet the first wood element 1110 does not have to be threaded into the second wood element 1120, which can possibly be difficult in the case of large wood elements.

FIG. 11E shows a component 1200 with a first wood element 1210 and a second wood element 1220. In this case, the first side of the first wood element 1210 and the first side of the second wood element 1220 are made respectively slanting, so that the first side of the first wood element 1210 and the first side of the second wood element 1220 are arranged parallel. This has the advantage that the hardened adhesive becomes wedged with the first wood element 1210 and the second wood element 1220 in the gap 1230. Yet the first wood element 1210 does not have to be threaded into the second wood element 1220, which can possibly be difficult in the case of large wood elements.

Figure 12:
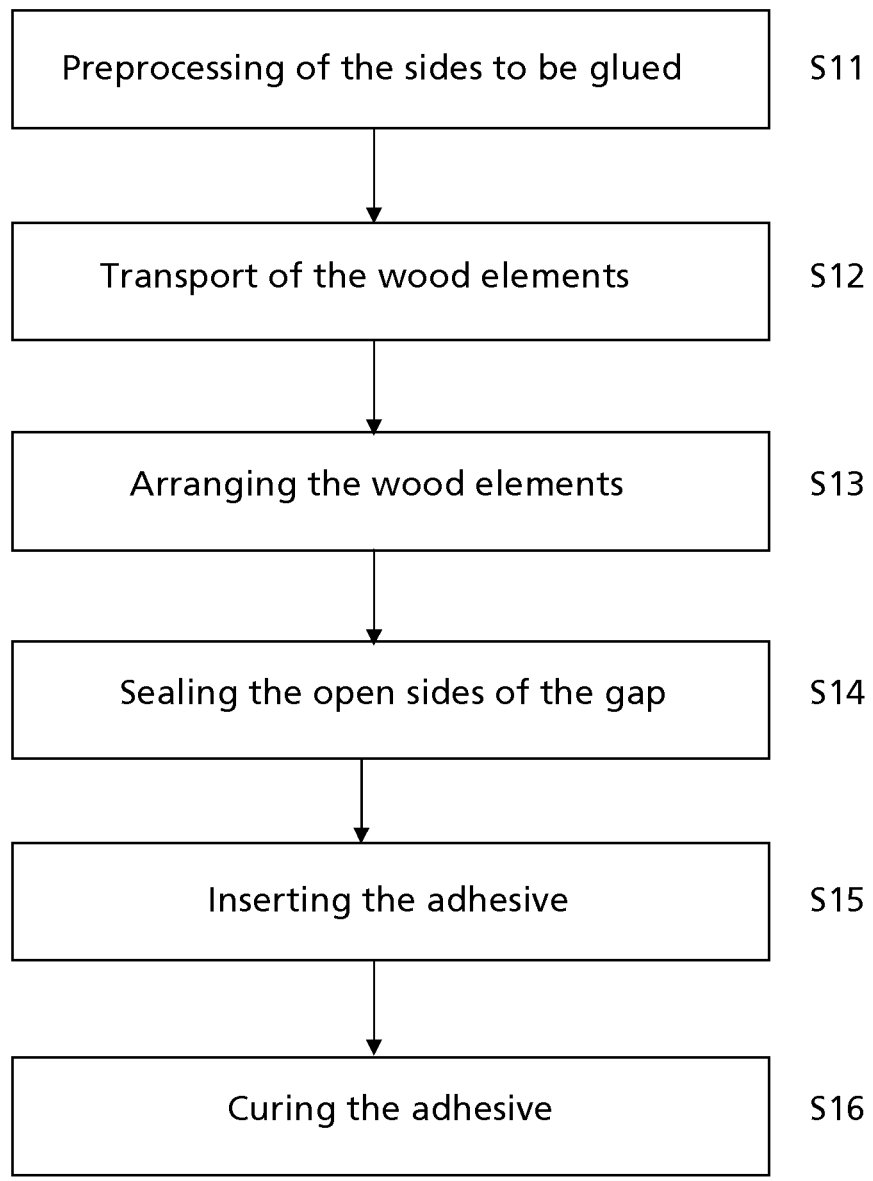
FIG. 12 an embodiment of a method for adhesively bonding two wood elements.

FIG. 12 shows the method for adhesively bonding two wood elements. In step S11, two wood elements are prepared for the connection. This includes for example the smoothing of the surfaces to be glued (first side) of the wood elements. This can occur for example through grinding/sanding or through filling-in. Afterwards, the surface to be glued is to be cleaned and covered with a protective film for transport. In step S12, the wood elements are transported to the location where they are to be connected. The step S12 can also take place before step S11. In step S13, the wood elements are arranged such that a gap remains between these wood elements and at least one main fiber direction of each wood element cuts the surface to be glued. Preferably, the wood elements are fastened in this position, so that a movement of the wood elements against one another is no longer possible. If the surface to be glued are protected by a protective film, this protective film must be removed prior to arranging the wood elements. During step S14, the open edges of this gap are sealed, for example by filling in the open sides. In step S15, the adhesive is introduced into the gap, e.g. through a hole drilled or left open in the filler material. Step S16 consists in hardening the adhesive.

Figure 13:
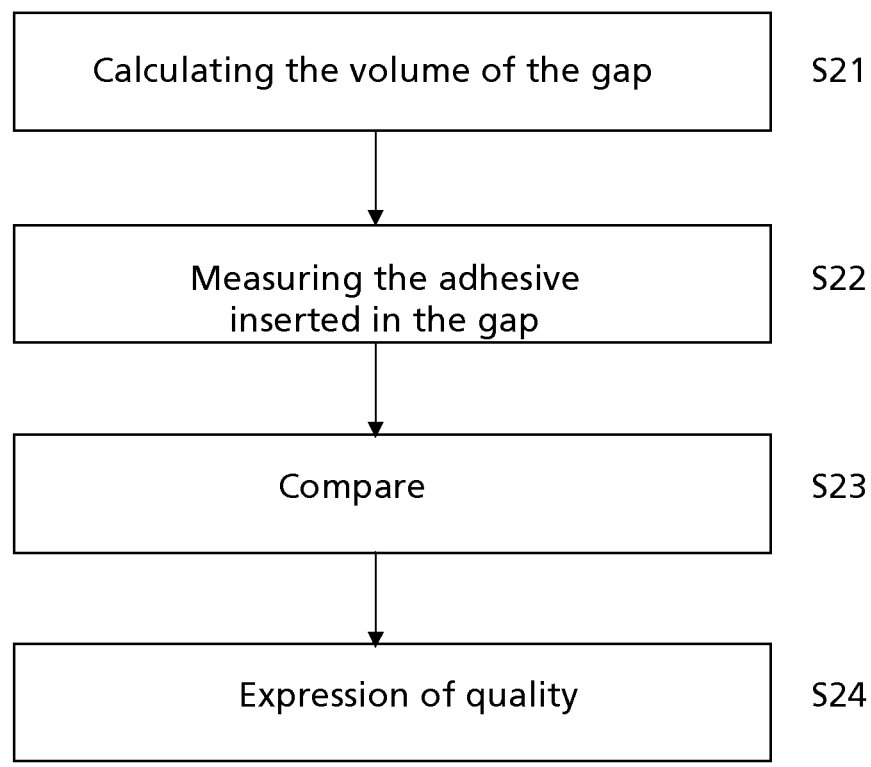
FIG. 13 an embodiment of a method for quality control of the adhesive bonding of two wood elements.

FIG. 13 shows a method for quality control of the adhesive bonding. To this effect, the volume of the sealed gap between the two wood elements is calculated theoretically (S21). In step S22, the quantity or volume of the adhesive filled into the gap is measured. Then, the calculated volume is compared with the filled-in volume (S23). If significantly more adhesive is filled in as was theoretically calculated, it is probable that the adhesive has run into the wood and the quality of the connection cannot be ensured. If significantly less adhesive has been filled in as theoretically computed, there is entrapped air in the adhesive and the quality of the connection can again not be ensured. In step S24, a statement is made about the quality of the connection.

In the case of large surfaces to be adhesively bonded, it is furthermore advantageous to divided the latter into sections sealed from one another and to perform the quality control method according to FIG. 13 for each of these sections. It is thus possible for each section to make a statement regarding quality and possibly to repeat the gluing process for this section.

The embodiments represented here are described merely by way of example and should not limit the scope of protection. All embodiments, including those not described, that fall within the scope of protection defined by the claims, are included within the invention.

The invention claimed is:

1. Ceiling comprising a plurality of wood elements forming the ceiling, wherein the plurality of wood elements comprises a first wood element, a second wood element and a third wood element, wherein the first wood element comprises a first main fiber direction and a third main fiber direction, wherein the second wood element comprises a second main fiber direction and a fourth main fiber direction, wherein the third wood element comprises a fifth main fiber direction and a sixth main fiber direction, wherein the first main fiber direction, the second main fiber direction and the fifth main fiber direction are parallel, wherein the third main fiber direction, the fourth main fiber direction and the sixth main fiber direction are parallel, wherein the first main fiber direction, the second main fiber direction, the third main fiber direction, the fourth main fiber direction, the fifth main fiber direction and the sixth main fiber direction are parallel to a plane of the ceiling, wherein the first wood element has a first side cutting through the first main fiber direction and a second side cutting through the second main fiber direction, wherein the second wood element has a first side cutting through the second main fiber direction, wherein the third wood element has a first side cutting through the fifth main fiber direction, wherein the first wood element on the first side has at least one area with the first main fiber direction formed by at least one first timber layer of the first wood element and at least one area with the third main fiber direction formed by at least one second timber layer of the first wood element, wherein the first wood element on the second side has at least one area with the first main fiber direction formed by the at least one first timber layer of the first wood element and at least one area with the third main fiber direction formed by the at least one second timber layer of the first wood element, wherein the second wood element on the first side has at least one area with the second main fiber direction formed by at least one first timber layer of the second wood element and at least one area with the fourth main fiber direction formed by at least one second timber layer of the second wood element, wherein the third wood element on the first side has at least one area with the fifth main fiber direction formed by at least one first timber layer of the third wood element and at least one area with the sixth main fiber direction formed by at least one second timber layer of the third wood element, wherein the second side of the first wood element is parallel to the first main fiber direction, wherein the second wood element has a second side parallel to the second main fiber direction, wherein the first side of the first wood element is adhesively bonded to the first side of the second wood element with a distance between the first side of the first wood element and the first side of the second wood element, wherein the distance is greater than 0.3 mm, wherein a gap created by the distance between the first side of the first wood element and the first side of the second wood element is filled with adhesive, wherein the at least one area of the first side of the first wood element with the first main fiber direction is adhesively bonded with the at least one area of the first side of the second wood element with the second main fiber direction, wherein the at least one area of the first side of the first wood element with the third main fiber direction is adhesively bonded with the at least one area of the first side of the second wood element with the fourth main fiber direction, wherein the first side of the first wood element has the shape of a plane surface and the first side of the second wood element has the shape of a plane surface, wherein the first side of the first wood element is adhesively bonded to the first side of the second wood element without a further wood element being adhesively bonded to the second side of the first wood element and the second side of the second wood element for creating a load-bearing connection between the first wood element and the second wood element, wherein the second side of the first wood element is adhesively bonded to the first side of the third wood element with a distance between the second side of the first wood element and the first side of the third wood element, wherein the distance is greater than 0.3 mm, wherein a gap created by the distance between the second side of the first wood element and the first side of the third wood element is filled with adhesive, wherein the at least one area of the second side of the first wood element with the third main fiber direction is adhesively bonded with the at least one area of the first side of the third wood element with the sixth main fiber direction, wherein the at least one area of the second side of the first wood element with the third main fiber direction is adhesively bonded with the at least one area of the first side of the third wood element with the sixth main fiber direction.

2. Ceiling according to claim 1, wherein the distance is greater than 1 mm.

3. Ceiling according to claim 1, wherein the adhesive bonding between the first wood element and the second wood element is designed for creating a load-bearing connection between the first wood element and the second wood element.

4. Ceiling according to claim 1, wherein the adhesive bonding between the first wood element and the second wood element is designed to withstand a traction, pressure, shear or torsion stress of at least 5 Newton per square millimeter.

5. Ceiling according to claim 1, wherein the first main fiber direction is arranged parallel to the second main fiber direction.

6. Ceiling according to claim 1, wherein the first wood element on the first side in the first main fiber direction does not overlap the second wood element on the first side.

7. Ceiling according to claim 1, wherein the first wood element on the first side has at least one area with the first main fiber direction and at least one area with a third main fiber direction, and the second wood element on the first side has at least one area with the second main fiber direction and at least one area with a fourth main fiber direction, wherein the area of the first wood element with the first main fiber direction is adhesively bonded with the area of the second wood element with the second main fiber direction.

8. Ceiling according to claim 1, wherein the first side of the first wood element is smoothed or filled in and/or the first side of the second wood element is smoothed or filled in.

9. Ceiling according to claim 1, wherein the first side of the first wood element and/or the first side of the second wood element has one of the following shapes:
a plane surface that is arranged at a right angle to the first and/or second main fiber direction,
a plane surface that forms an angle between 90° and 45° to the first and/or second main fiber direction.

10. Ceiling according to claim 1, wherein the first side of the first wood element is parallel to the first side of the second wood element.

11. Ceiling according to claim 1, wherein the first side of the first wood element does not contact the first side of the second wood element.

12. Method for connecting a first wood element with a second wood element and with a third wood element to form a panel, wherein the first wood element comprises a first main fiber direction and a third main fiber direction, wherein the second wood element comprises a second main fiber direction and a fourth main fiber direction, wherein the third wood element comprises a fifth main fiber direction and a sixth main fiber direction, wherein the first wood element has a first side cutting through the first main fiber direction and a second side cutting through the second main fiber direction, wherein the second wood element has a first side cutting through the second main fiber direction, wherein the third wood element has a first side cutting through the fifth main fiber direction, wherein the first wood element on the first side has at least one area with the first main fiber direction formed by at least one first timber layer of the first wood element and at least one area with the third main fiber direction formed by at least one second timber layer of the first wood element, wherein the first wood element on the second side has at least one area with the first main fiber direction formed by the at least one first timber layer of the first wood element and at least one area with the third main fiber direction formed by the at least one second timber layer of the first wood element, wherein the second wood element on the first side has at least one area with the second main fiber direction formed by at least one first timber layer of the second wood element and at least one area with the fourth main fiber direction formed by at least one second timber layer of the second wood element, wherein the third wood element on the first side has at least one area with the fifth main fiber direction formed by at least one first timber layer of the third wood element and at least one area with the sixth main fiber direction formed by at least one second timber layer of the third wood element, the method comprising the following steps:

arranging the first wood element and the second wood element
    such that the first side of the first wood element is arranged at a distance greater than 0.3 mm to the first side of the second wood element,
    such that the first main fiber direction, the second main fiber direction, the third main fiber direction and the fourth main fiber direction are parallel to a plane of the panel,
    such that the at least one area of the first side of the first wood element with the first main fiber direction faces the at least one area of the first side of the second wood element with the second main fiber direction, and
    such that the at least one area of the first side of the first wood element with the third main fiber direction faces the at least one area of the first side of the second wood element with the fourth main fiber direction,
  arranging the first wood element and the third wood element
    such that the second side of the first wood element is arranged at a distance greater than 0.3 mm to the first side of the third wood element,
    such that the first main fiber direction, the second main fiber direction, the fifth main fiber direction and the sixth main fiber direction are parallel to a plane of the panel,
    such that the at least one area of the second side of the first wood element with the third main fiber direction faces the at least one area of the first side of the third wood element with the sixth main fiber direction, and
    such that the at least one area of the second side of the first wood element with the third main fiber direction is adhesively bonded with the at least one area of the first side of the third wood element with the sixth main fiber direction,
  introducing adhesive in the space between the first side of the first wood element and the first side of the second wood element;
  introducing adhesive in the space between the second side of the first wood element and the first side of the third wood element;
  curing the adhesive.

13. Method according to claim 12, wherein prior to filling the space between the first side of the first wood element and the first side of the second wood element with adhesive, at least part of the open edges of the space generated by the distance between the first side of the first wood element and the first side of the second wood element are sealed.

14. Method according to claim 13, wherein the at least one part of the open edges is filled in for sealing.

15. Method according to claim 13, wherein
  the volume enclosed between the first sides of the first and second wood element is calculated,
  the volume of the adhesive filled between the first side of the first wood element and the first side of the second wood element is measured,
  the calculated volume is compared with the measured volume, and
  a statement is made about the quality of the connection on the basis of the comparison.

16. Method according to claim 15, wherein
  the volume enclosed between the first sides of the first and second wood element are subdivided in sub-volumes sealed vis-à-vis one another,
  the volume of a first sub-volume enclosed between the first sides of the first and second wood element is calculated,
  the volume of the adhesive filled into the first sub-volume is measured,
  the calculated volume is compared with the measured volume, and
  a statement is made about the quality of the connection on the basis of the comparison.

17. Ceiling comprising a plurality of wood elements forming the ceiling, wherein the plurality of wood elements comprises a first wood element, a second wood element and a third wood element, wherein the first wood element comprises a first main fiber direction and a third main fiber direction, wherein the second wood element comprises a second main fiber direction and a fourth main fiber direction, wherein the third wood element comprises a fifth main fiber direction and a sixth main fiber direction, wherein the first main fiber direction, the second main fiber direction and the fifth main fiber direction are parallel, wherein the third main fiber direction, the fourth main fiber direction and the sixth main fiber direction are parallel, wherein the first main fiber direction, the second main fiber direction, the third main fiber direction, the fourth main fiber direction, the fifth main fiber direction and the sixth main fiber direction are parallel to a plane of the ceiling, wherein the first wood element has a first side cutting through the first main fiber direction and a second side cutting through the second main fiber direction, wherein the second wood element has a first side cutting through the second main fiber direction, wherein the third wood element has a first side cutting through the fifth main fiber direction, wherein the first wood element on the first side has at least one area with the first main fiber direction formed by at least one first timber layer of the first wood element and at least one area with the third main fiber direction formed by at least one second timber layer of the first wood element, wherein the first wood element on the second side has at least one area with the first main fiber direction formed by the at least one first timber layer of the first wood element and at least one area with the third main fiber direction formed by the at least one second timber layer of the first wood element, wherein the second wood element on the first side has at least one area with the second main fiber direction formed by at least one first timber layer of the second wood element and at least one area with the fourth main fiber direction formed by at least one second timber layer of the second wood element, wherein the third wood element on the first side has at least one area with the fifth main fiber direction formed by at least one first timber layer of the third wood element and at least one area with the sixth main fiber direction formed by at least one second timber layer of the third wood element, wherein the first side of the first wood element is adhesively bonded to the first side of the second wood element with a distance between the first side of the first wood element and the first side of the second wood element, wherein the distance is greater than 0.3 mm, wherein a gap created by the distance between the first side of the first wood element and the first side of the second wood element is filled with adhesive, wherein the at least one area of the first side of the first wood element with the first main fiber direction is adhesively bonded with the at least one area of the first side of the second wood element with the second main fiber direction, wherein the at least one area of the first side of the first wood element with the third main fiber direction is adhesively bonded with the at least one area of the first side of the second wood element with the fourth main fiber direction, wherein the second side of the first wood element is adhesively bonded to the first side of the third wood element with a distance between the second side of the first wood element and the first side of the third wood element, wherein the distance is greater than 0.3 mm, wherein a gap created by the distance between the second side of the first wood element and the first side of the third wood element is filled with adhesive, wherein the at least one area of the second side of the first wood element with the third main fiber direction is adhesively bonded with the at least one area of the first side of the third wood element with the sixth main fiber direction, wherein the at least one area of the second side of the first wood element with the third main fiber direction is adhesively bonded with the at least one area of the first side of the third wood element with the sixth main fiber direction.

18. Ceiling comprising a plurality of wood elements forming the ceiling, wherein the plurality of wood elements comprises a first wood element, a second wood element and a third wood element, wherein the first wood element comprises a first main fiber direction and a third main fiber direction, wherein the second wood element comprises a second main fiber direction and a fourth main fiber direction, wherein the third wood element comprises a fifth main fiber direction and a sixth main fiber direction, wherein the first main fiber direction, the second main fiber direction and the fifth main fiber direction are parallel, wherein the third main fiber direction, the fourth main fiber direction and the sixth main fiber direction are parallel, wherein the first main fiber direction, the second main fiber direction, the third main fiber direction, the fourth main fiber direction, the fifth main fiber direction and the sixth main fiber direction are parallel to a plane of the ceiling, wherein the first wood element has a first side cutting through the first main fiber direction and a second side cutting through the second main fiber direction, wherein the second wood element has a first side cutting through the second main fiber direction, wherein the third wood element has a first side cutting through the fifth main fiber direction, wherein the first wood element on the first side has at least one area with the first main fiber direction formed by at least one first timber layer of the first wood element and at least one area with the third main fiber direction formed by at least one second timber layer of the first wood element, wherein the first wood element on the second side has at least one area with the first main fiber direction formed by the at least one first timber layer of the first wood element and at least one area with the third main fiber direction formed by the at least one second timber layer of the first wood element, wherein the second wood element on the first side has at least one area with the second main fiber direction formed by at least one first timber layer of the second wood element and at least one area with the fourth main fiber direction formed by at least one second timber layer of the second wood element, wherein the third wood element on the first side has at least one area with the fifth main fiber direction formed by at least one first timber layer of the third wood element and at least one area with the sixth main fiber direction formed by at least one second timber layer of the third wood element, wherein the second side of the first wood element is parallel to the first main fiber direction, wherein the second wood element has a second side parallel to the second main fiber direction;

wherein the first side of the first wood element is adhesively bonded to the first side of the second wood element with a distance between the first side of the first wood element and the first side of the second wood element, wherein the distance is greater than 0.3 mm, wherein a gap created by the distance between the first side of the first wood element and the first side of the second wood element is filled with adhesive, wherein the adhesive bonding between the first wood element and the second wood element is designed to withstand a traction, pressure, shear or torsion stress of at least 5 Newton per square millimeter, wherein the at least one area of the first side of the first wood element with the first main fiber direction is adhesively bonded with the at least one area of the first side of the second wood element with the second main fiber direction, wherein the at least one area of the first side of the first wood element with the third main fiber direction is adhesively bonded with the at least one area of the first side of the second wood element with the fourth main fiber direction, wherein the first side of the first wood element is adhesively bonded to the first side of the second wood element without a further wood element being adhesively bonded to the second side of the first wood element and the second side of the second wood element for creating a load-bearing connection between the first wood element and the second wood element, wherein the second side of the first wood element is adhesively bonded to the first side of the third wood element with a distance between the second side of the first wood element and the first side of the third wood element, wherein the distance is greater than 0.3 mm, wherein a gap created by the distance between the second side of the first wood element and the first side of the third wood element is filled with adhesive, wherein the at least one area of the second side of the first wood element with the third main fiber direction is adhesively bonded with the at least one area of the first side of the third wood element with the sixth main fiber direction, wherein the at least one area of the second side of the first wood element with the third main fiber direction is adhesively bonded with the at least one area of the first side of the third wood element with the sixth main fiber direction.

19. Component comprising a plurality of wood elements forming a panel, wherein the plurality of wood elements comprises a first wood element, a second wood element and a third wood element, wherein the first wood element comprises a first main fiber direction and a third main fiber direction, wherein the second wood element comprises a second main fiber direction and a fourth main fiber direction, wherein the third wood element comprises a fifth main fiber direction and a sixth main fiber direction, wherein the first main fiber direction, the second main fiber direction and the fifth main fiber direction are parallel, wherein the third main fiber direction, the fourth main fiber direction and the sixth main fiber direction are parallel, wherein the first main fiber direction, the second main fiber direction, the third main fiber direction, the fourth main fiber direction, the fifth main fiber direction and the sixth main fiber direction are parallel to a plane of the panel, wherein the first wood element has a first side cutting through the first main fiber direction and a second side cutting through the second main fiber direction, wherein the second wood element has a first side cutting through the second main fiber direction, wherein the third wood element has a first side cutting through the fifth main fiber direction, wherein the first wood element on the first side has at least one area with the first main fiber direction formed by at least one first timber layer of the first wood element and at least one area with the third main fiber direction formed by at least one second timber layer of the first wood element, wherein the first wood element on the second side has at least one area with the first main fiber direction formed by the at least one first timber layer of the first wood element and at least one area with the third main fiber direction formed by the at least one second timber layer of the first wood element, wherein the second wood element on the first side has at least one area with the second main fiber direction formed by at least one first timber layer of the second wood element and at least one area with the fourth main fiber direction formed by at least one second timber layer of the second wood element, wherein the third wood element on the first side has at least one area with the fifth main fiber direction formed by at least one first timber layer of the third wood element and at least one area with the sixth main fiber direction formed by at least one second timber layer of the third wood element, wherein the first side of the first wood element is adhesively bonded to the first side of the second wood element with a distance between the first side of the first wood element and the first side of the second wood element, wherein the distance is greater than 0.3 mm, wherein a gap created by the distance between the first side of the first wood element and the first side of the second wood element is filled with adhesive, wherein the at least one area of the first side of the first wood element with the first main fiber direction is adhesively bonded with the at least one area of the first side of the second wood element with the second main fiber direction, wherein the at least one area of the first side of the first wood element with the third main fiber direction is adhesively bonded with the at least one area of the first side of the second wood element with the fourth main fiber direction, wherein the second side of the first wood element is adhesively bonded to the first side of the third wood element with a distance between the second side of the first wood element and the first side of the third wood element, wherein the distance is greater than 0.3 mm, wherein a gap created by the distance between the second side of the first wood element and the first side of the third wood element is filled with adhesive, wherein the at least one area of the second side of the first wood element with the third main fiber direction is adhesively bonded with the at least one area of the first side of the third wood element with the sixth main fiber direction, wherein the at least one area of the second side of the first wood element with the third main fiber direction is adhesively bonded with the at least one area of the first side of the third wood element with the sixth main fiber direction.

20. Ceiling according to claim 17, wherein the first main fiber direction is perpendicular to the second main fiber direction, wherein the at least one first timber layer and the at least one second timber layer of the first, second and third wood element are parallel to the plane of the ceiling.

21. Ceiling according to claim 20, wherein the first wood element comprises a third and a fourth side, wherein the first, second, third and fourth side of first wood element form a rectangular, wherein the second wood element comprises a second, third and a fourth side, wherein the first, second, third and fourth side of second wood element form a rectangular, wherein the third wood element comprises a second, third and a fourth side, wherein the first, second, third and fourth side of third wood element form a rectangular, wherein the first and second side of the first wood element, the first side of the second wood element and the first side of the third wood element are arranged perpendicular to the plane of the storey ceiling, wherein the first main fiber direction is perpendicular to the first side of the first wood element, wherein the third main fiber direction is perpendicular to the second side of the first wood element, wherein the second main fiber direction is perpendicular to the first side of the second wood element, wherein the sixth main fiber direction is perpendicular to the first side of the third wood element.

* * * * *